(12) United States Patent
Raab

(10) Patent No.: US 11,454,492 B2
(45) Date of Patent: Sep. 27, 2022

(54) ARTICULATED ARM LOCALIZATION

(71) Applicant: FARO Technologies, Inc., Lake Mary, FL (US)

(72) Inventor: Simon Raab, Santa Barbara, CA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 769 days.

(21) Appl. No.: 16/440,355

(22) Filed: Jun. 13, 2019

(65) Prior Publication Data

US 2020/0080834 A1 Mar. 12, 2020

Related U.S. Application Data

(60) Provisional application No. 62/730,084, filed on Sep. 12, 2018.

(51) Int. Cl.
| | | |
|---|---|---|
| *G01B 11/00* | (2006.01) | |
| *G01B 5/008* | (2006.01) | |
| *G06T 7/70* | (2017.01) | |
| *H04N 5/247* | (2006.01) | |
| *H04N 5/225* | (2006.01) | |

(52) U.S. Cl.
CPC ............ *G01B 11/005* (2013.01); *G01B 5/008* (2013.01); *G06T 7/70* (2017.01); *G06T 2207/10012* (2013.01); *H04N 5/2253* (2013.01); *H04N 5/247* (2013.01)

(58) Field of Classification Search
CPC .................... G01B 11/005; G06T 7/70; G06T 2207/10012
USPC .......................................................... 33/503
See application file for complete search history.

(56) References Cited

U.S. PATENT DOCUMENTS

| | | |
|---|---|---|
| 2015/0330761 A1 | 11/2015 | Gong |
| 2015/0330762 A1 | 11/2015 | Gong |
| 2015/0330763 A1 | 11/2015 | Gong |
| 2015/0330764 A1 | 11/2015 | Gong |
| 2015/0330765 A1 | 11/2015 | Gong |
| 2015/0330766 A1 | 11/2015 | Gong |
| 2015/0355310 A1 | 12/2015 | Gong et al. |

OTHER PUBLICATIONS

"A Strong Team for Vehicle Safety" Continental Safety Engineering International GmbH-Germany, Hexagon Manufacturing Intelligence, https://www.hexagonmi.com/en-GB/solutions/case-studies/vehicle-testing/a-strong-team-for-vehicle-safety, site visit Aug. 15, 2019.

*Primary Examiner* — Amir Shahnami
(74) *Attorney, Agent, or Firm* — Cantor Colburn LLP

(57) ABSTRACT

Techniques for localizing a portable articulated arm coordinate measuring machine (AACMM) are described. An example localization method includes in response to an AACMM base being placed at a first position, capturing a first set of images of a positioning element in a predetermined area. The method further includes determining first 3D coordinates of the positioning element using the first set of images. 3D coordinates corresponding to a position of a first measurement probe in the predetermined area are computed using the first 3D coordinates. Further, the method includes, in response to the base being moved to a second position, determining second 3D coordinates of the positioning element from the second position using a second set of images. Further, the localization method includes determining a translation matrix to convert the second 3D coordinates to the first 3D coordinates.

20 Claims, 14 Drawing Sheets

ARTICULATED ARM LOCALIZATION

CROSS REFERENCE TO RELATED APPLICATIONS

This application claims the benefit of U.S. Provisional Application Ser. No. 62/730,084, filed Sep. 12, 2018, the entire disclosure of which is incorporated herein by reference.

BACKGROUND

The present disclosure relates to articulated arm localization, and in particular the localization including or cooperating with a portable articulated arm coordinate measuring machine (AACMM).

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3D) form on a computer screen. In other cases, the data are provided to the user in numeric form, for example when measuring the diameter of a hole, the text "Diameter=1.0034" is displayed on a computer screen.

Today, probes and accessories of AACMM tend to drift when replaced with other probes or accessories. They are subject to shocks when mounted on stands or tables. They tend to lose accuracy when moved from place to place. They may be difficult to use with other 3D measuring devices such as laser trackers.

Accordingly, while existing AACMM's are suitable for their intended purposes there remains a need for improvements when AACMM probes or accessories are changed. Further improvements are needed when AACMMs are mounted on structures, moved from place to place, or used cooperatively with other 3D measuring devices.

BRIEF DESCRIPTION

According to one aspect of the invention, A portable articulated arm coordinate measuring machine (AACMM) for measuring the coordinates of an object in space, includes a base, and a manually positionable arm portion having an opposed first end and second end, the arm portion being rotationally coupled to the base, the arm portion including a plurality of connected arm segments, each arm segment including at least one position transducer for producing a position signal. The AACMM further includes an electronic circuit configured to localize the AACMM. The localization includes, in response to the base being placed at a first position, receiving a first frame of reference associated with a predetermined area, and capturing a first set of images of a positioning element in the predetermined area using at least two image capture devices. The localization further includes determining first 3D coordinates of the positioning element in the first frame of reference from the first position using the first set of images, and receiving the position signal from the at least one position transducer and computing 3D coordinates corresponding to a position of a first measurement probe in the predetermined area, the 3D coordinates based on the first frame of reference. Further, the localization includes, in response to the base being moved to a second position, capturing a second set of images of the positioning element in the predetermined area using the at least two image capture devices, determining second 3D coordinates of the positioning element from the second position using the second set of images. Further, the localization includes determining a translation matrix to convert the second 3D coordinates to the first 3D coordinates, and receiving the position signal from the at least one position transducer and computing the 3D coordinates corresponding to the position of the first measurement probe in the predetermined area, the 3D coordinates converted to the first frame of reference by using the translation matrix.

According to another aspect of the invention, a method for localizing a portable articulated arm coordinate measuring machine (AACMM) includes in response to the base being placed at a first position, receiving a first frame of reference associated with a predetermined area, and capturing a first set of images of a positioning element in the predetermined area using at least two image capture devices. The localization method further includes determining first 3D coordinates of the positioning element in the first frame of reference from the first position using the first set of images, and receiving the position signal from the at least one position transducer and computing 3D coordinates corresponding to a position of a first measurement probe in the predetermined area, the 3D coordinates based on the first frame of reference. Further, the localization method includes, in response to the base being moved to a second position, capturing a second set of images of the positioning element in the predetermined area using the at least two image capture devices, determining second 3D coordinates of the positioning element from the second position using the second set of images. Further, the localization method includes determining a translation matrix to convert the second 3D coordinates to the first 3D coordinates, and receiving the position signal from the at least one position transducer and computing the 3D coordinates corresponding to the position of the first measurement probe in the predetermined area, the 3D coordinates converted to the first frame of reference by using the translation matrix.

According to another aspect of the invention, a computer program product includes a memory storage device having computer executable instructions stored therein, the computer executable instructions when executed by a processor cause the processor to localize a portable articulated arm coordinate measuring machine (AACMM). The localization includes, in response to the base being placed at a first position, receiving a first frame of reference associated with a predetermined area, and capturing a first set of images of a positioning element in the predetermined area using at least two image capture devices. The localization further includes determining first 3D coordinates of the positioning element in the first frame of reference from the first position using the first set of images, and receiving the position signal from the at least one position transducer and computing 3D coordinates corresponding to a position of a first measurement probe in the predetermined area, the 3D coordinates based on the first frame of reference. Further, the localization includes, in response to the base being moved to a second position, capturing a second set of images of the positioning element in the predetermined area using the at least two image capture devices, determining second 3D coordinates of the positioning element from the second position using the second set of images. Further, the localization includes determining a translation matrix to convert the second 3D coordinates to the first 3D coordinates, and receiving the position signal from the at least one position transducer and computing the 3D coordinates corresponding to the position of the first measurement probe in the predetermined area, the 3D coordinates converted to the first frame of reference by using the translation matrix.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments disclosed herein provide for an AACMM system that may be moved about an area and its six degree-of-freedom position and orientation may be determined when the AACMM is moved about the area. This provides advantages in allowing the AACMM to be moved during operation and the measured coordinate points transformed into a common coordinate frame of reference.

Figure 1A:
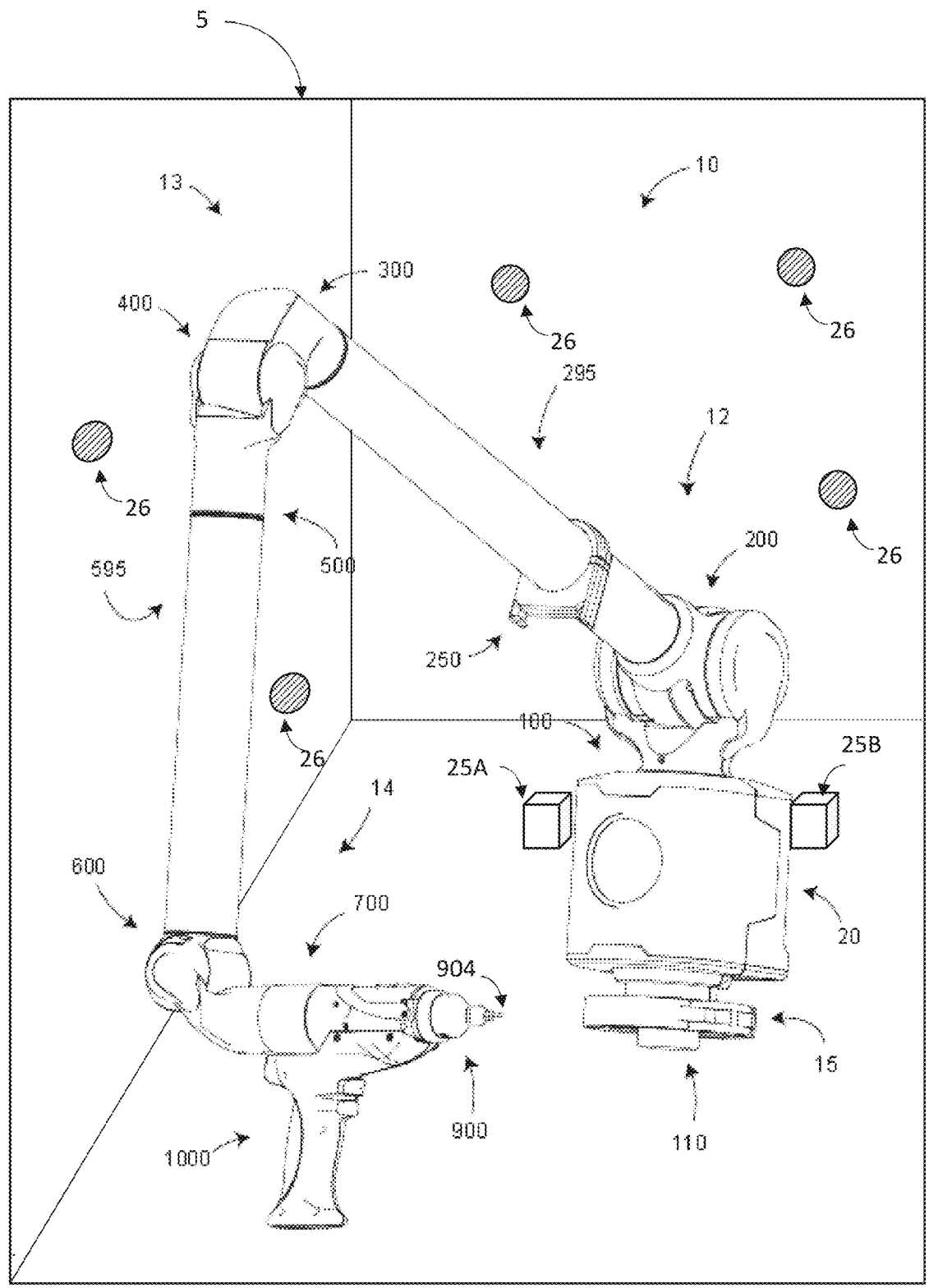
FIGS. 1A, 1B are two isometric views of a portable articulated AACMM according to an embodiment of the present invention.
Figure 1B:
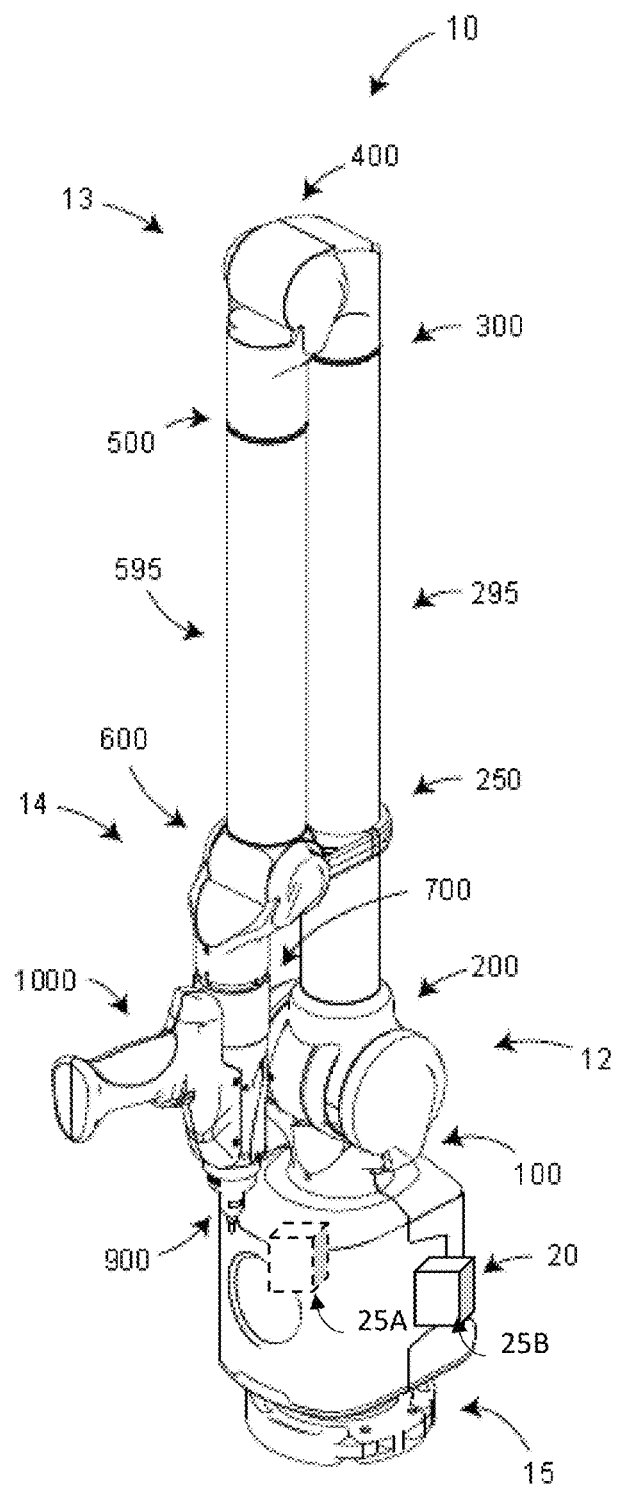
Figure 1C:
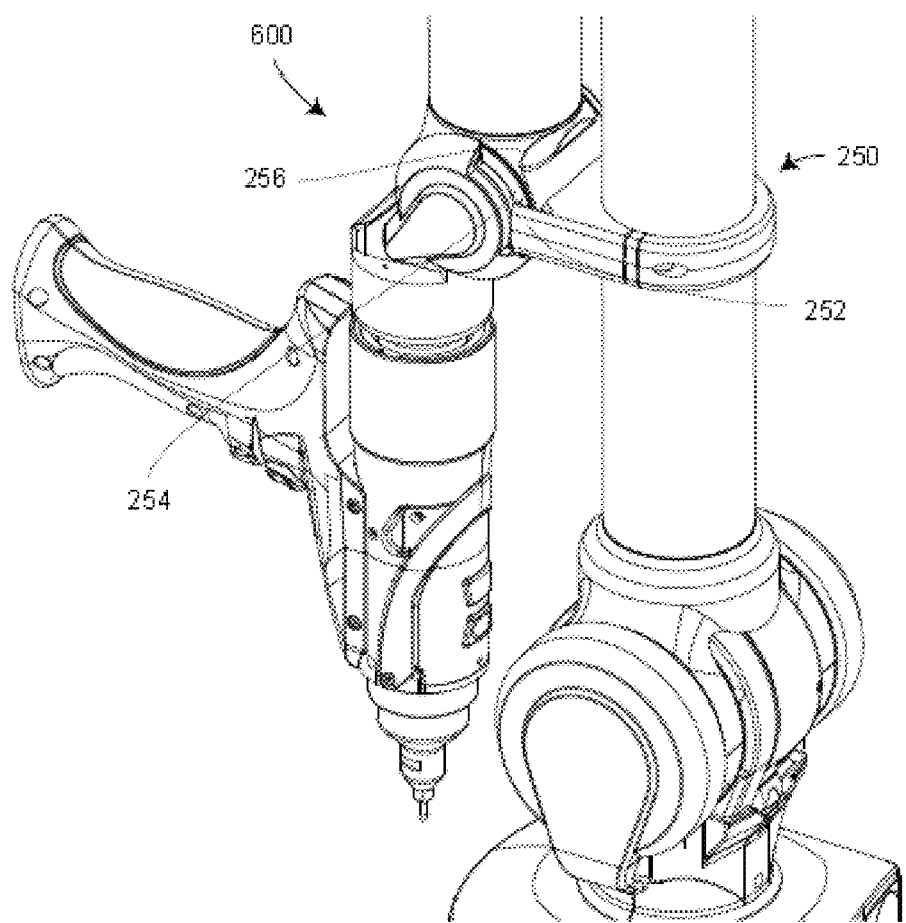
FIG. 1C is a partial isometric view of an AACMM according to an embodiment of the present invention.

FIGS. 1A, 1B, 1C illustrate, in isometric view, an AACMM 10 according to various embodiments of the present invention, the AACMM being one type of coordinate measuring machine. In an embodiment, a first segment 295 and a second segment 595 are connected to a base 20 on one end and a measurement device on the other end. In an embodiment, the measurement device is a tactile-probe assembly 900.

In an embodiment illustrated in FIGS. 1A, 1B, 1C, the AACMM 10 comprises includes seven rotational elements; hence the AACMM 10 is referred to as a seven-axis AACMM. In other embodiments discussed herein below, the AACMM 10 is a six-axis AACMM. The seven-axis AACMM 10 of FIGS. 1A, 1B, 1C includes first-axis assembly 100, second-axis assembly 200, third-axis assembly 300, fourth-axis assembly 400, fifth-axis assembly 500, sixth-axis assembly 600, and seventh-axis assembly 700. In an embodiment, a tactile probe assembly 900 and a handle 1000 are attached to the seventh-axis assembly. Each of the axis assemblies may provide either a swivel rotation or a hinge rotation. In the embodiment illustrated in FIGS. 1A, 1B, 1C, the first-axis assembly 100 provides a swivel rotation about an axis aligned to a mounting direction of the base 20. In an embodiment, the second axis assembly 200 provides a hinge rotation about an axis perpendicular to the first segment 295. The combination of the first-axis assembly 100 and the second-axis assembly 200 is sometimes colloquially referred to as a shoulder 12 since in some embodiments the possible motions of the shoulder 12 of the AACMM 10 resemble the motions possible with a human shoulder.

In the embodiment illustrated in FIGS. 1A, 1B, 1C, the third-axis assembly 300 provides a swivel rotation about an axis aligned to the first segment 295. The fourth-axis assembly 400 provides a hinge rotation about an axis perpendicular to second segment 595. The fifth-axis assembly 500 provides a swivel rotation about an axis aligned to the second segment 595. The combination of the third-axis assembly 300, the fourth-axis assembly 400, and the fifth-axis assembly 500 is sometimes colloquially referred to as an elbow 13 since in some embodiments the possible motions of the elbow 13 of the AACMM 10 resemble the motions possible with a human elbow.

In the embodiment illustrated in FIGS. 1A, 1B, 1C, the sixth-axis assembly provides a hinge rotation about an axis perpendicular to the second segment 595. In an embodiment, the AACMM 10 further comprises a seventh-axis assembly, which provides a swivel rotation of probe assemblies (e.g. probe 900) attached to the seventh axis. The sixth-axis assembly 600, or the combination of the sixth-axis assembly 600 and the seventh-axis assembly 700, is sometimes colloquially referred to as a wrist 14 of the AACMM 10. The wrist 14 is so named because in some embodiments it provides motions similar to those possible with a human wrist. The combination of the shoulder 12, first segment 295, elbow 13, second segment 595, and wrist 14 resembles in many ways a human arm from human shoulder to human wrist. In some embodiments, the number of axis assemblies associated with each of the shoulder, elbow, and wrist differ from the number shown in FIGS. 1A, 1B, 1C. It is possible, for example, to move the third-axis assembly 300 from the elbow 13 to the shoulder 12, thereby increasing the number of axis assemblies in the shoulder to three and reducing the number of axis assemblies in the wrist to two. Other axis combinations are also possible.

In an embodiment, a parking clamp 250 on the first segment 295 includes parking-clamp fingers 252 (FIG. 1C) that tie together the first segment 295 to the second segment 595 while holding both segments in a vertical orientation. In an embodiment, the parking-clamp fingers 252 grip a parking clamp recess 254 while a sixth-axis yoke bumper 256 cushions the parking clamp 250 against the sixth-axis assembly 600, thereby reducing or preventing potential mechanical shock as the first segment 295 and the second segment 595 are brought together. In an embodiment, the parking clamp 250 holds the first segment 295 and the second segment 595 fixed vertical orientation, thereby reducing or minimizing the space taken by the arm segments 295, 595 when the AACMM 10 is not in use performing a measurement. In an embodiment, an operator may release the parking clamp fingers 252, thereby permitting free movement of the arm segments 295, 595 as illustrated in FIG. 1A. In another embodiment, the parking clamp is attached to the second segment 595 rather than the first segment 295. In another embodiment, the parking clamp fingers attach to a different element than the parking-clamp recess of FIG. 1C. In another embodiment, clamping is provided by a different mechanism than the parking-clamp fingers 252.

In an embodiment, the AACMM further includes a bumper, the bumper coupled to the AACMM and arranged to make contact with the parking clamp when the plurality of fingers are pressed into place in the parking clamp recess.

Figure 2A:
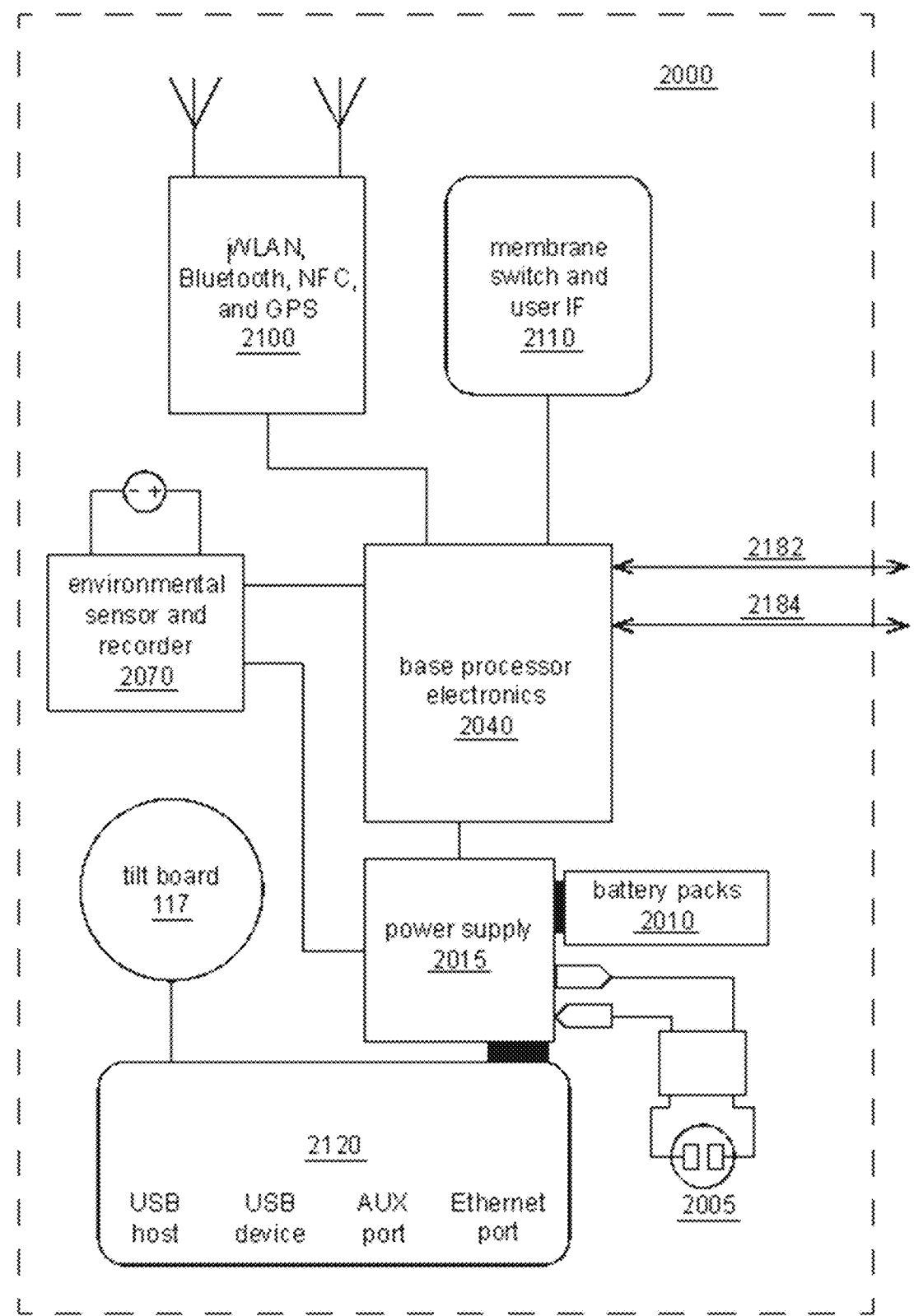
FIG. 2A is a block diagram of base electronics of an AACMM of FIG. 1 according to an embodiment of the present invention.
Figure 2B:
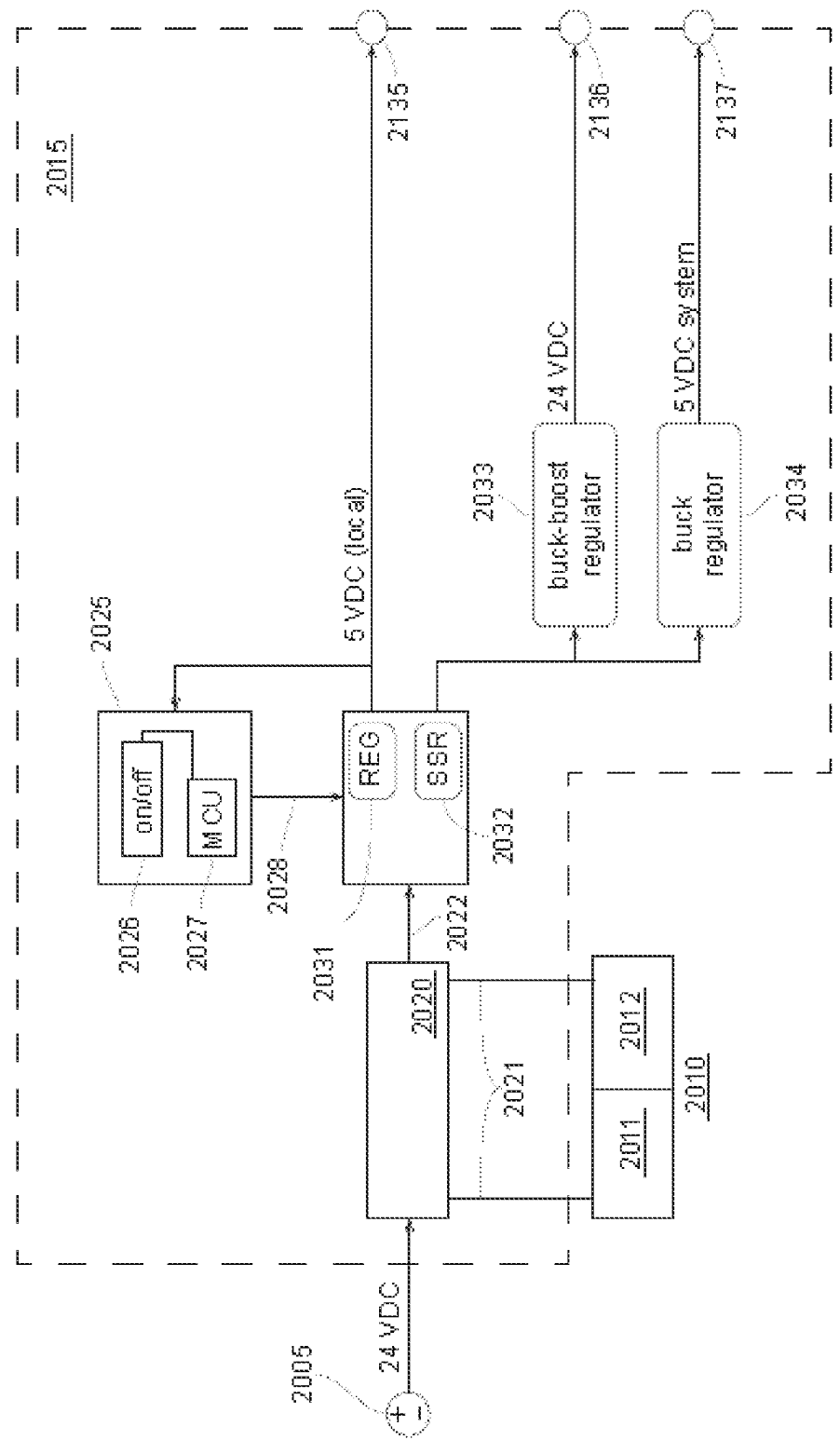
FIGS. 2B, 2C, 2D are block diagrams providing further detail of elements within the block diagram of FIG. 2A according to an embodiment of the present invention.

FIG. 2A is a block diagram of base electronics 2000. FIG. 2A includes modular power supply 2005, battery packs 2010, and a power supply 2015. These elements are shown in greater detail in a block diagram of FIG. 2B. In an embodiment, the modular power supply 2005 is located external to the power supply 2015 and is plugged into AC power mains to provide a dual battery smart charger 2020 with a voltage of 24 VDC. In an embodiment, the dual battery smart charger 2020 provides a portion of the voltage from the modular power supply 2005 to charge one or both of smart battery packs. In an embodiment, a System Management Bus (SMBUS) 2021, which is a single-ended simple two-wire bus for the purpose of lightweight communication, provides communication among the dual battery smart charger 2020 and smart battery packs 2010. In an embodiment, the smart battery packs 2010 include a first battery pack 2011 and a second battery pack 2012. In an embodiment, one battery pack provides electrical power to the AACMM 10 while the other battery pack is being charged. In an embodiment, either or both battery packs 2011, 2012 may be removed while power from the modular power supply 2005 is being applied. In other words, the battery packs may be "hot swapped."

Figure 6:
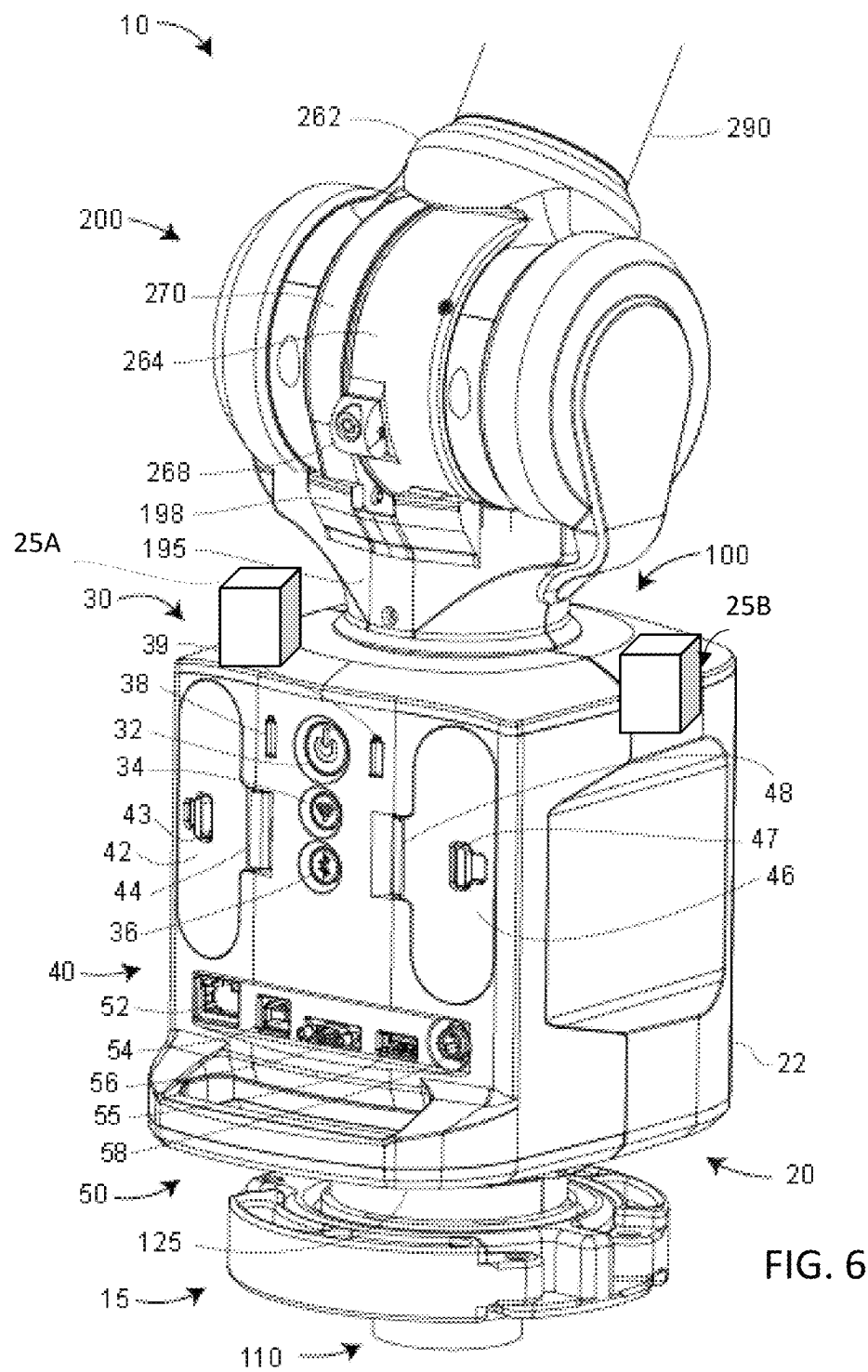
FIG. 6 is an isometric view describing some elements in a lower portion of the AACMM according to an embodiment of the present invention.

In an embodiment, each battery pack 2011, 2012 includes a 14.4 VDC lithium-ion battery. In an embodiment, the battery packs 2011, 2012 are disposed in the base 20 behind a first battery door 42 and a second battery door 46, respectively, as shown in FIG. 6. In an embodiment, the first battery door 42 and the second battery door 46 cooperate with a first battery-door hinge 44 and a second battery-door hinge 48, respectively, as well as a first battery-door latch 43 and a second battery-door latch 47, respectively. In an embodiment, a first-battery indicator light 38 and a second-battery indicator light 39 indicate an extent to which the first battery pack 2011 and the second battery pack 2012, respectively, are charged. In an embodiment, the external 24 VDC power supply attaches with a locking connector to a power supply port 58 shown in FIG. 6.

Part of the electrical power passing through the line 2022 arrives at the regulator 2031, which provides a 5 VDC local voltage through a point 2135 to the environmental sensor and recorder 2070 (FIG. 2D) and to a user interface (IF) 2025, which includes an electrical on/off switch 2026 and a microcontroller (MCU) 2027. The electrical on/off switch 2026 is activated in response to pressing of a mechanical on-off button 32 shown in FIG. 6. When the on/off switch 2026 is in the on state, the MCU 2027 produces a signal 2028 that causes a solid-state relay (SSR) 2032 to close, passing the voltage on the line 2022 to a buck-boost regular 2033 and a buck regulator 2034. The buck regulator 2034 provides a 5 VDC system voltage, which from a point 2137 is stepped down to secondary voltages 3.3 VDC, 1.8 VDC, 1.5 VDC, and 1.2 VDC for use by processors and memory. The buck-boost regulator 2033 provides a 24 VDC signal from a point 2136 to electronics in the arm segments, the arm end, and accessories attached to the arm end.

Figure 2C:
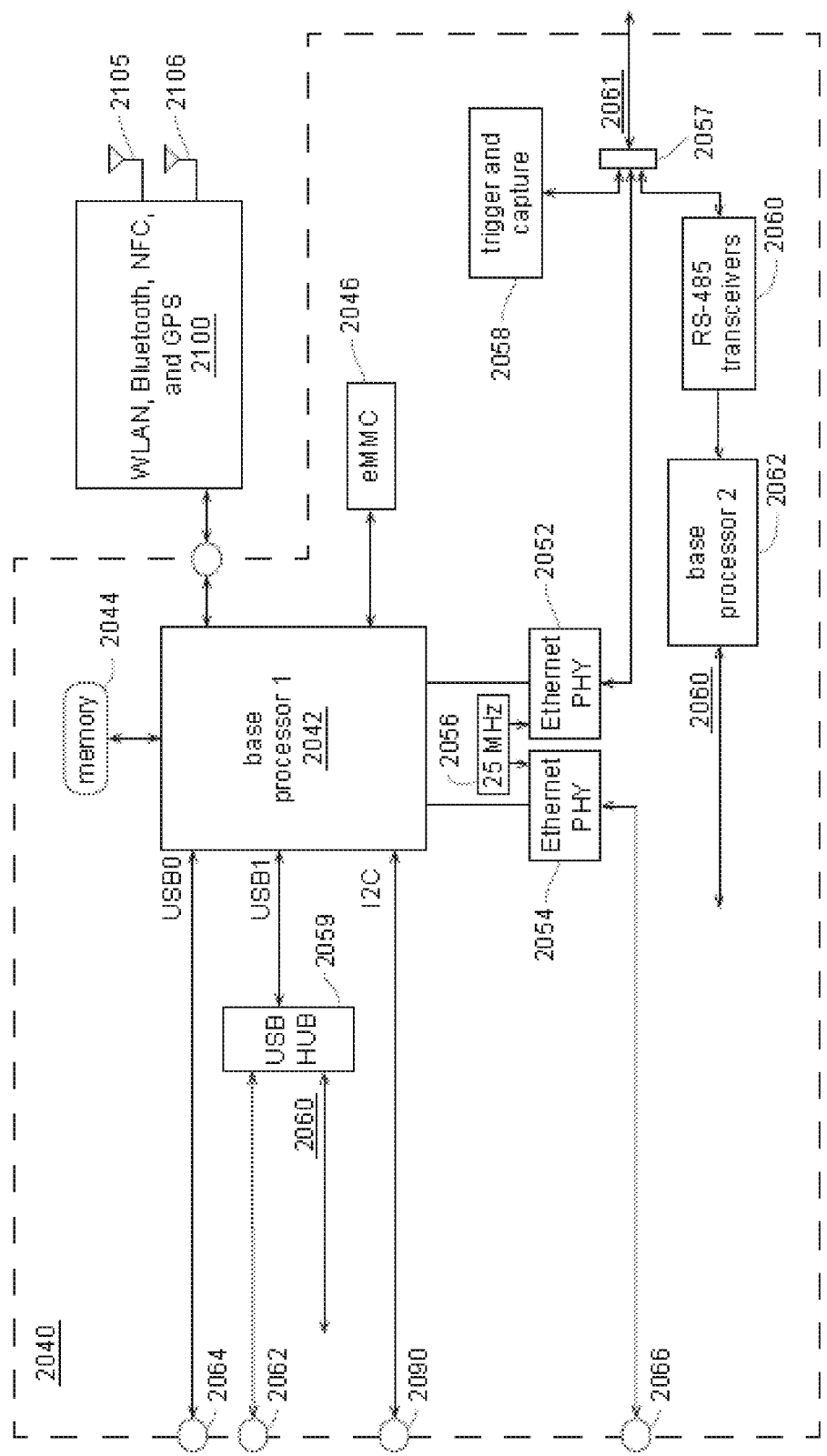
Figure 2D:
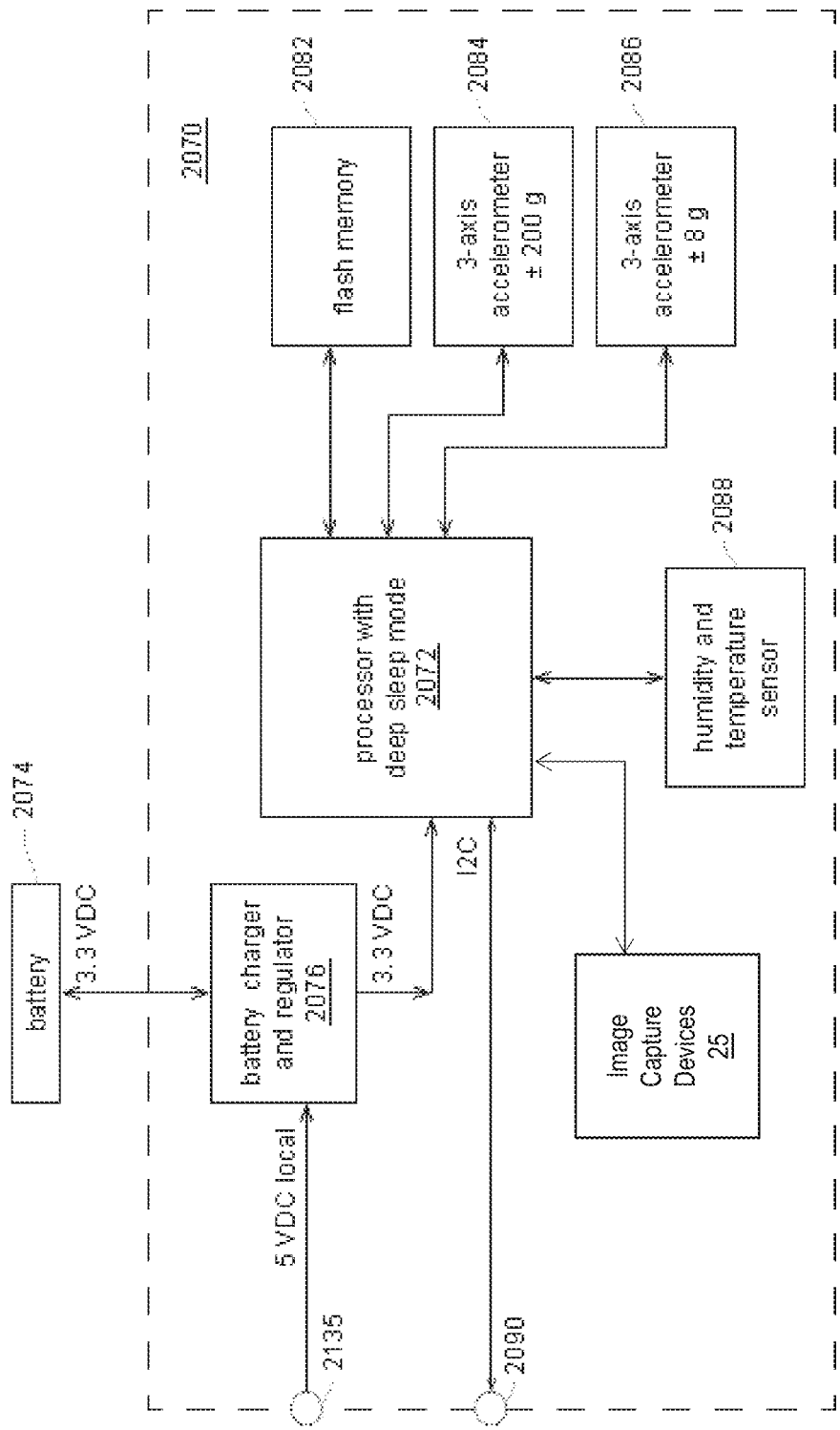

A block diagram of the environmental sensor and recorder 2070 is shown in FIG. 2D. If the voltage on the line 2022 is zero, then the 5 VDC local voltage is not present at the point 2135 in the environmental sensor and recorder 2070. In this case, a battery 2074 provides a 3.3 VDC signal to the components of the environmental sensor and recorder 2070. The 3.3 VDC signal passes through a battery charger and regulator 2076 to provide the 3.3 VDC signal to a processor with deep-sleep mode 2072. The processor 2072 receives readings from a humidity-and-temperature sensor 2088, a three-axis accelerometer 2084 that measures to ±200 g, and a three-axis accelerometer 2086 that measures to ±8 g. In operation, the processor stores readings every 15 minutes on a flash memory 2082. In an embodiment, the processor also saves on the flash memory 2082 large acceleration events observed by the three-axis accelerometers 2084, 2086. If the 5 VDC local voltage is present at the point 2135, then the battery charger 2076 uses the 5 VDC local voltage to charge the battery 2074.

In one or more examples, the processor 2072 communicates with the image capture devices 25, which can include the at least two image capture devices 25A-B. In one or more examples, the image capture devices 25 capture images of one or more positioning elements 26 upon receiving a command from the processor 2072. In one or more examples, the command may be part of an overarching command to localize the AACMM 10. In one or more examples, the image capture devices 25 also emit a light for capturing the one or more images.

FIG. 2C is a block diagram of the base processor electronics 2040, which includes a first base processor 2042 and a second base processor 2062. In an embodiment, the second base processor 2062 is a real-time processor. In an embodiment, the processor with deep sleep mode 2072 (FIG. 2D) communicates with the first base processor 2042 over an Inter-Integrated Circuit (I2C) bus through the point 2090. In an embodiment, whenever electrical power is being provided to the AACMM 10 by the modular power supply 2005 rather than a battery pack, the first base processor 2042 provides a 5 VDC, 2.5 Amp signal through a Universal Serial Bus (USB) external device port 2064 for use by any external device. This voltage is provided to a USB charging port 55 shown in FIG. 6A. A user may attach any compatible device to obtain power from the USB charging port 55. Currently USB standards are ratified by a USB Implementers Forum (USB-IF).

In an embodiment, the first base processor 2042 exchanges data through a point with external USB host devices, such as external computing devices, over a USB data transfer port 54 shown in FIG. 6. In an embodiment, electrical signals pass to and from the USB host device through a point 2062 to a USB hub 2059 and on to the first base processor 2042.

In an embodiment, an Ethernet signal may be provided over an Ethernet port 52 as shown in FIG. 6. Ethernet is a computer networking technology based on IEEE 802.3 standards. The Ethernet signal arrives at a point 2066 in FIG. 2C, travels to an Ethernet PHY 2054, which is clocked at 25 MHz, before arriving at the first base processor 2042. The Ethernet PHY 2054 provides analog signals physical access to a link layer.

A second Ethernet path enables bidirectional communication with electrical components internal to the AACMM 10. The second Ethernet path, which includes an Ethernet PHY 2052, passes through a connector 2057 to join a collection of busses 2061. In an embodiment, the Ethernet is gigabit Ethernet, which means that data may be transferred at a rate of one gigabit per second. In an embodiment, the second Ethernet path mainly transfers data obtained by AACMM accessory devices such as laser line probes (LLPs).

In an embodiment, electrical signals obtained from a tactile-probe assembly (e.g. probe 900) pass through an RS-485 transceiver 2060 before arriving at the second base processor 2062. Examples of a tactile-probe assembly are a hard-probe assembly 900 shown in FIGS. 1A, 1B and a touch-trigger probe assembly (not shown). When directed by an operator, a hard-probe assembly 900 returns encoder readings to the base processor electronics 2040 at regular intervals set by a capture signal sent from the base processor electronics 2040. At each capture interval, angular readings are returned to the base processor electronics 2040, thereby enabling calculation of a position of a probe tip 904 on the hard-probe assembly 900. In contrast, a touch-trigger probe assembly triggers a reading when a designated force is applied to the probe tip 904. Hence angular readings are taken in response to the trigger signal sent from the touch-trigger probe assembly. A signaling unit 2058 broadcasts capture signals and receives trigger signals. In an embodiment, the capture signals and trigger signals travel along a first bus 2182, shown in FIGS. 2, 4A, 4B. The second base processor 2062 communicates with the first base processor 2042 through a USB slave line 2060 that passes through the USB hub 2058 coupled to the first base processor 2042.

In an embodiment, the first base processor 2042 further connects to an embedded Multi-Media Controller (eMMC) 2046, which includes both flash memory and a flash memory controller integrated on the same silicon die. In an embodiment, the first base processor 2042 further connects to a memory 2044, which in an embodiment is a double data rate type-three synchronous dynamic random-access memory (DDR3 SDRAM).

In an embodiment, the base processor electronics 2040 further interfaces with a board 2100 having accessory communication and sensor devices. In an embodiment, the board 2100 includes a wireless local area network (WLAN) 2101. In an embodiment, the WLAN 2101 is an IEEE 802.11 Wi-Fi network enabled by pressing a Wi-Fi button 34 shown in FIG. 6A. Wi-Fi enables wireless communication between the AACMM 10 and an external device such as a stationary or mobile computing device.

In an embodiment, the board 2100 further includes a Bluetooth™ Low Energy (BLE) device 2102 capable of wirelessly exchanging data with external devices such as computing devices. BLE is a wireless personal area network technology designed and marketed by the Bluetooth Special Interest Group. The BLE device 2102 is enabled by pressing a Bluetooth™ button 36 shown in FIG. 6A. The on-off button 32, the Wi-Fi button 34, and the Bluetooth™ button 36 are all part of a larger membrane switch and user interface (IF) 2110 shown in FIG. 2A.

In an embodiment, the board 2100 further includes near-field communication (NFC) hardware 2103. In an embodiment, the NFC hardware 2103 includes a dual-interface memory/tag device that communicates with an external NFC reader and a wired port that communicates with the first base processor 2042. In another embodiment, the NFC hardware includes a single-port NFC tag that communicates with an external NFC reader but may does not include a wired port for communicating with the first base processor 2042. The single-port NFC tag may store and transmit device data such as serial number, configuration, revision data, or encoder identification data. Descriptions of NFC use in AACMMs are given in commonly owned United States Published Patent Applications 2015/0330761, 2015/0330762, 2015/0330763, 2015/0330764, 2015/0330765, 2015/0330766, the contents all of which are incorporated by reference herein.

In an embodiment, the board 2100 further includes a global positioning system (GPS) receiver 2104. In an embodiment, the GPS receiver 2104 is used to track the location of the AACMM 10, for example, to determine the location of the AACMM 10 when leased. In another embodiment, the GPS receiver 2104 is used to synchronize multiple instruments, which may include AACMMs, laser trackers, scanners, or other devices. Descriptions of GPS used with AACMMs are given in United States Published Patent Application 2015/0355310, the contents of which is incorporated by reference herein. In an embodiment, WLAN 2101, Bluetooth™ 2102, NFC 2103, and GPS 2104 are used in conjunction with antennas, which may include antennas 2105, 2106.

Figure 3:
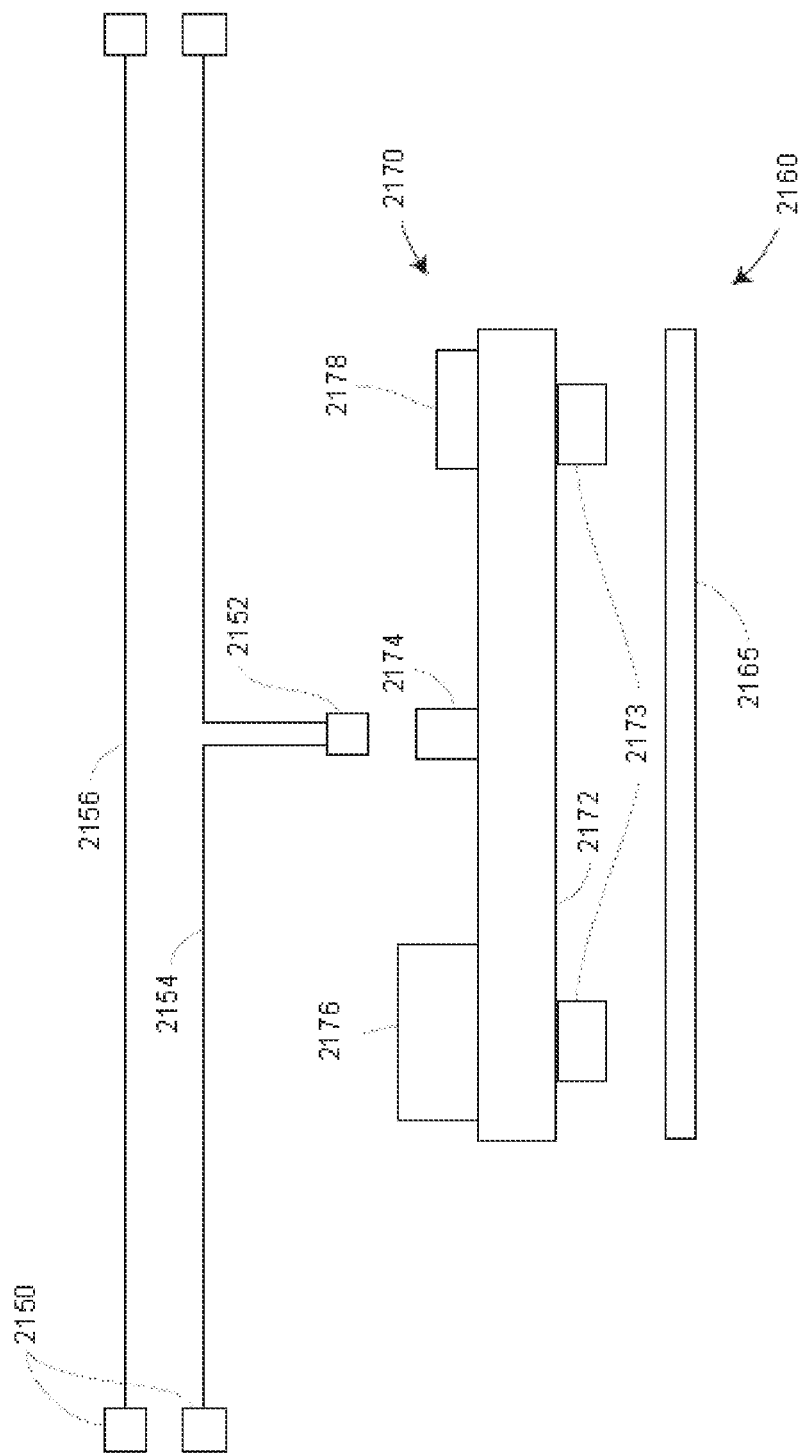
FIG. 3 is a block diagram of bus cables and their relation to encoder components according to an embodiment of the present invention.

In an embodiment illustrated in FIG. 3, angles of rotation of the axis assemblies 100, 200, 300, 400, 500, 600, 700 of the AACMM 10 are measured with angular transducers. In an embodiment, the angular transducers are angular encoders 2160, elements of which are illustrated schematically in FIG. 3. In an embodiment, an angular encoder 2160 includes an encoder disk 2165 and encoder electronics 2170. In an embodiment, encoder electronics 2170 includes an encoder printed circuit board (PCB) 2172, one or more read heads 2173, processor and support electronics 2176, temperature sensor connector 2178, and board connector 2174. In an embodiment, the encoder disk 2165 includes a collection of radially directed lines, the positions of which are sensed by the one or more read heads 2173 and the sensed positions processed with processor and support electronics 2176, to determine an angle of rotation of the encoder disk 2165 in relation to the read heads 2173. In an embodiment, each board connector 2174 is attached to a T-connector 2152 of a T-cable 2154 within the first bus 2182 (FIG. 2A). Each encoder PCB 2172 connects to a corresponding T-cable 2154 of the first bus 2182. Cable connectors 2150 on each end of the T-cable 2154 attach to cable connectors 2154 on adjacent T-cables 2154 in the AACMM 10. In this way, angle information may be transferred from each angular encoder 2160 through the first bus 2182 to the main processor electronics 2040 for further processing. The transmitted angles are synchronized to the capture signal, which in an embodiment has a rate of around one kilohertz. By connecting a single T-connector 2152 to a corresponding single board connector 2174, the angular encoders 2160 continue to send their angle readings to the base processor electronics 2040 even if one or more of the encoder electronics 2170 are disconnected from the first bus 2182. In an embodiment, cable connectors 2150 are provided on each end of an interconnect cable 2156 of the second bus 2184 (FIG. 2A). Cable connectors 2150 of adjacent interconnect cables 2156 are connected together to provide a continuous electrical path for the second bus 2184.

Figure 4A:
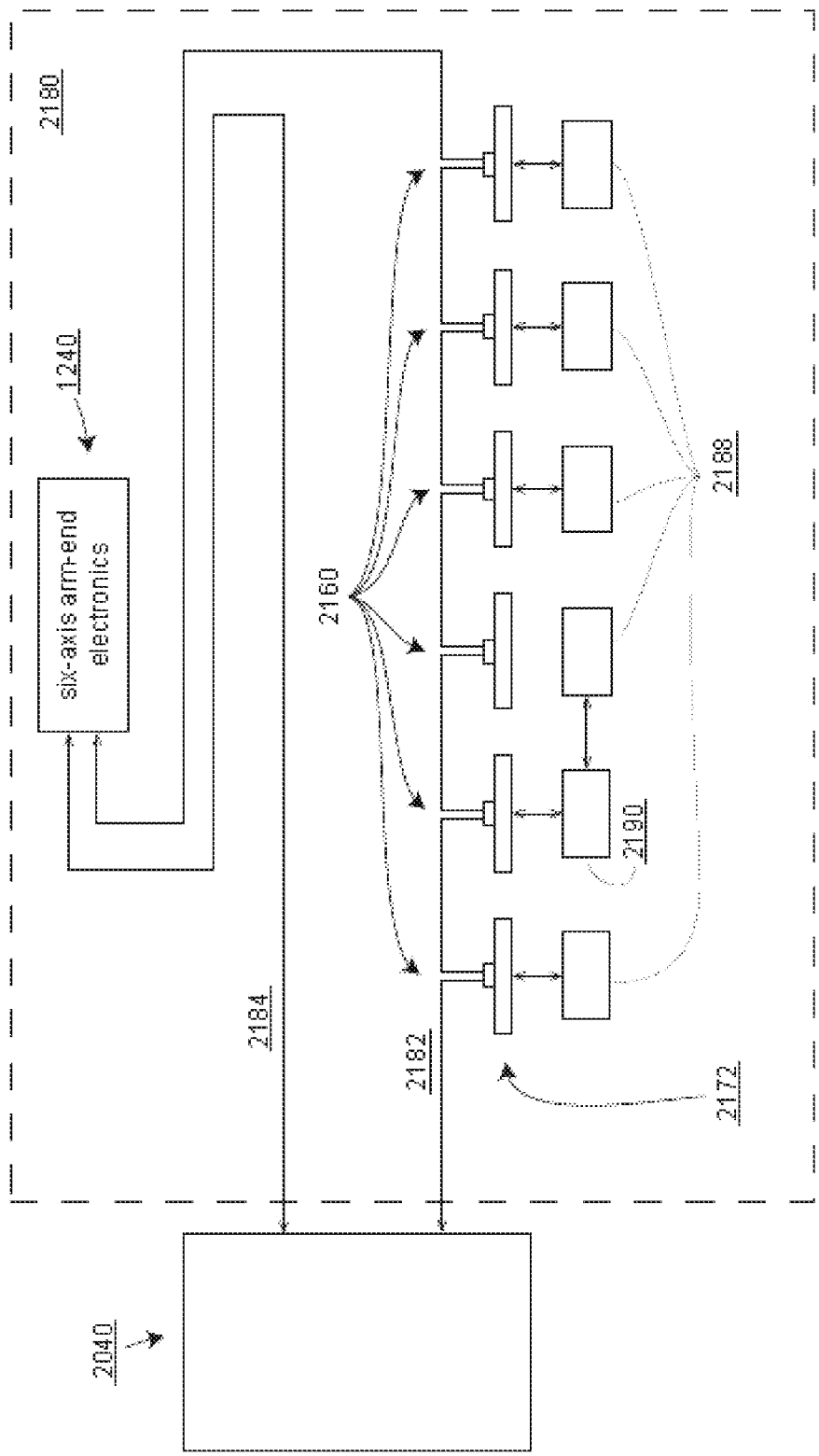
FIGS. 4A, 4B are block diagrams of interconnecting elements in six-axis electronics and seven-axis electronics according to an embodiment of the present invention.

FIG. 4A shows electrical elements 2180 in a six-axis AACMM. The electrical elements 2180 include six angular encoders 2160 attached by the first bus 2182 to the base processor electronics 2040 on one end, and to six-axis arm-end electronics 1240 on the other end. In an embodiment, one or more of the encoder PCBs 2172 are attached to an expandable temperature sensor 2190. When an expandable temperature sensor 2190 is attached to the temperature sensor connector 2178 (FIG. 3), a further temperature sensor 2188 may be attached to the expandable temperature sensor 2190. In an embodiment, some temperature sensors 2188 are not expandable. In an embodiment, at least one temperature sensor, either 2188 or 2190, is placed in the vicinity of each angular encoder to provide the possibility of compensating angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to six-axis arm-end electronics 1240.

Figure 4B:
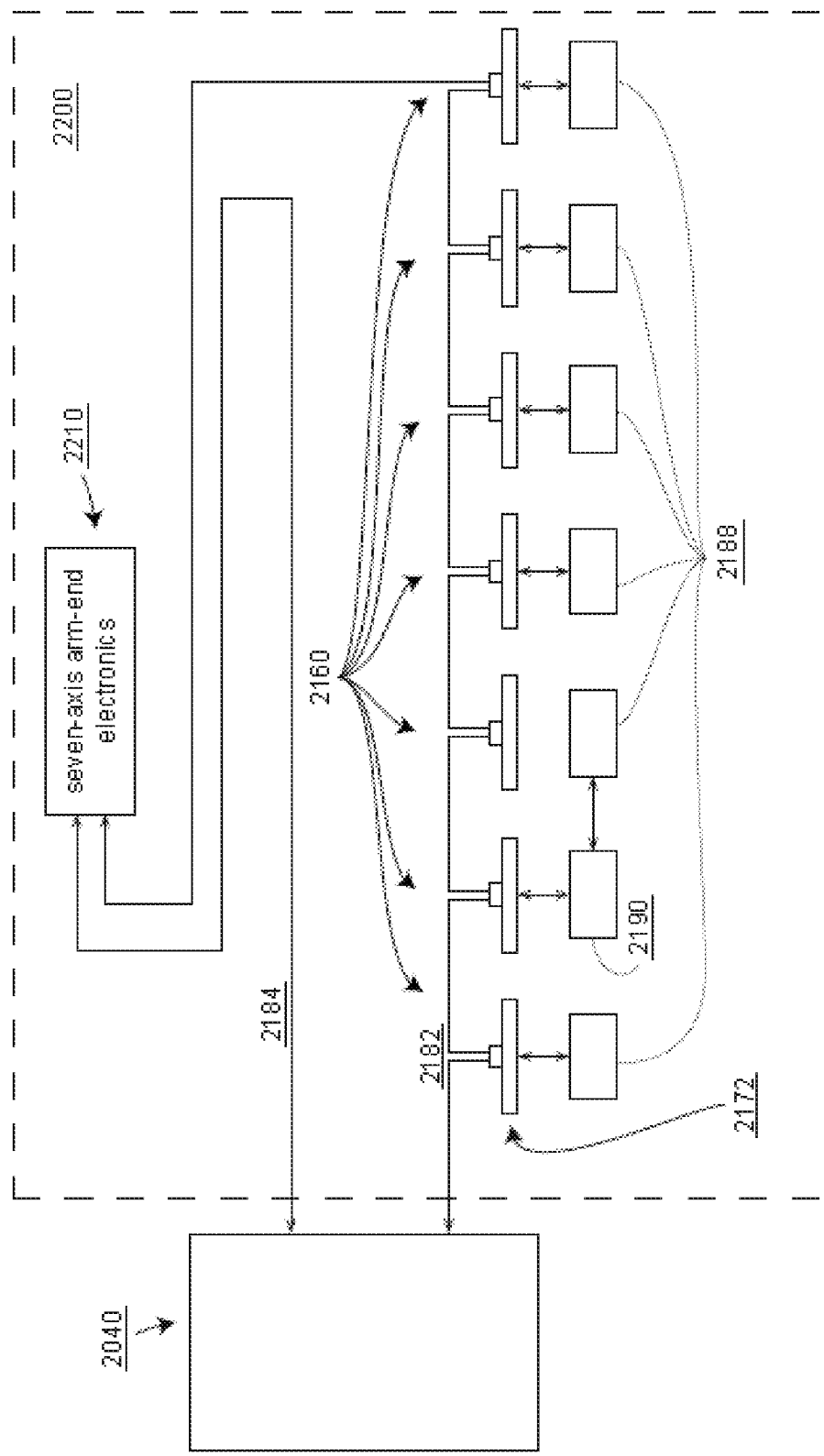

FIG. 4B shows electrical elements 2200 in a seven-axis AACMM. The electrical elements 2200 include seven angular encoders 2160 attached by the first bus 2182 to the base processor electronics 2040 on one end and to seven-axis arm-end electronics 2210 on the other end. In an embodiment, one or more of the encoder PCBs 2172 are attached to an expandable temperature sensor 2190. When an expandable temperature sensor 2190 is attached to the temperature sensor connector 2178, a further temperature sensor 2188 may be attached to the expandable temperature sensor 2190. In an embodiment, some temperature sensors 2188 are not expandable. In an embodiment, at least one temperature sensor, either 2188 or 2190, is placed in a vicinity of the angular encoders to allow for the compensation of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to seven-axis arm-end electronics 2210.

Figure 5:
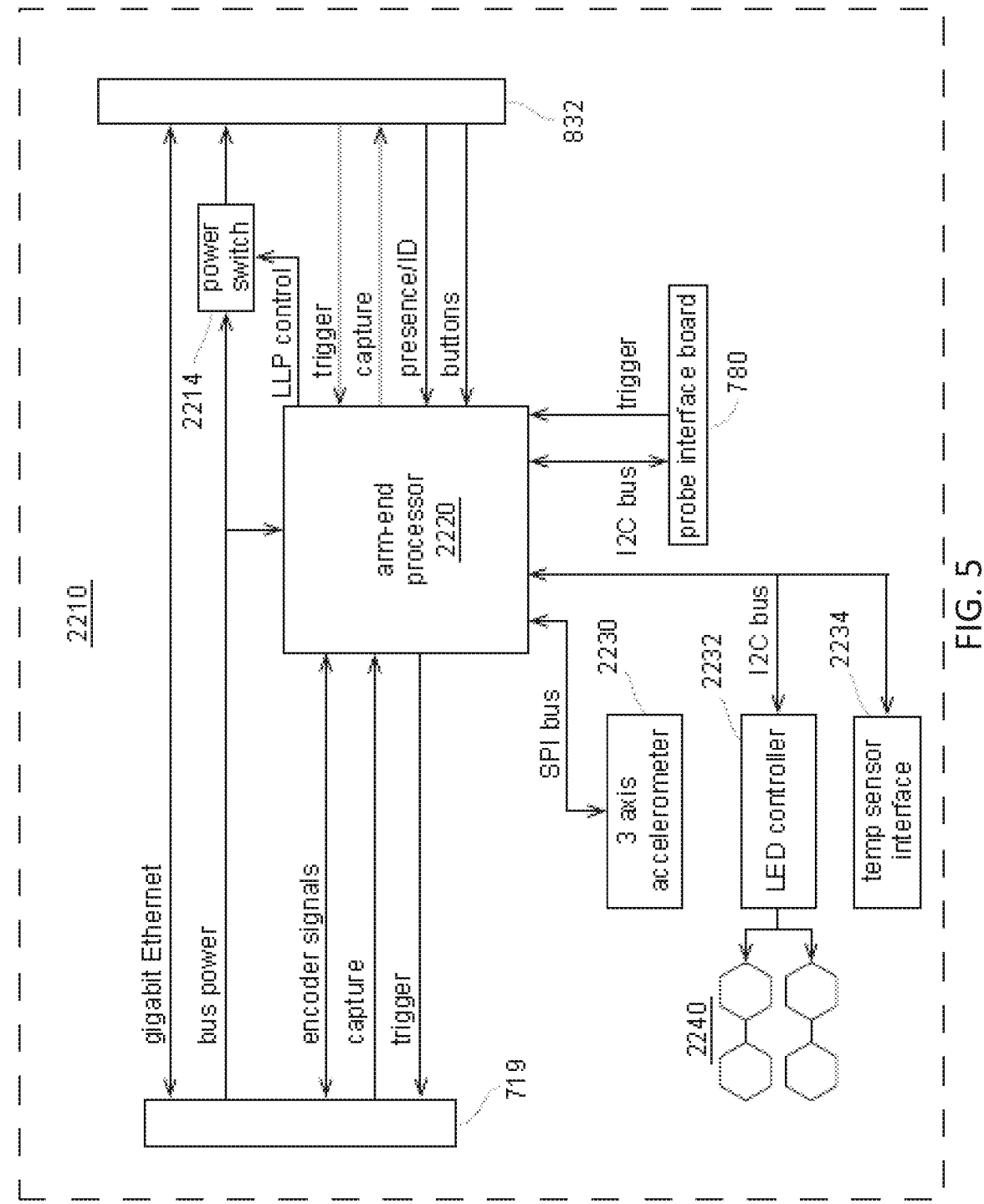
FIG. 5 is a block diagram of seven-axis arm-end electronics according to an embodiment of the present invention.

FIG. 5 is a block diagram of elements of the seven-axis arm-end electronics 2210. Bus connectors 719, include two electrical connectors that attach to cable connectors 2150 (FIG. 3) of the first bus 2182 (FIG. 2A) and the second bus 2184 of the sixth-axis assembly 600. An arm-to-handle connector 832 in FIG. 5, connects to a handle-to-arm connector of an accessory such as a laser line probe (LLP) or to a handle. The seven-axis arm-end electronics 2210 also include a probe interface board 780 that facilitates making electrical contact with removable tactile probes. The probe interface board 780 communicates bidirectionally with the arm-end processor 2220 through an I2C bus.

In an embodiment, the seven-axis arm-end electronics 2210 includes an arm-end processor 2220. In an embodiment, the arm-end processor 2220 is electrically connected to a three-axis accelerometer 2230 through a serial peripheral interface (SPI) bus. The three-axis accelerometer 2230 provides a record of severe impacts to the arm end. A record of such impacts may provide a clue to an origin of problems observed in service.

In an embodiment, the arm-end processor 2220 is further connected to a light-emitting diode (LED) controller 2232 through an I2C bus. In an embodiment, the LEDs 2240 are red-blue-green (RGB) LEDs that provide any of a plurality of colors within the visible spectrum. The LED controller 2232 provides control signals to the LEDs 2240 to control aspects such as emitted colors and light levels from the LEDs 2240. In an embodiment, the light emitted from the LEDs 2240 is controlled separately for each LED 2240 so that light emitted by the LEDs 2240 may be one color from an upper light diffuser and another color from a lower light diffuser of an end-effector assembly.

In an embodiment, the arm-end processor 2220 also communicates with a temperature sensor interface 2234 over an I2C bus. The temperature sensor interface provides a measured temperature that may be used to compensate for thermal expansion of elements attached to the end of the arm.

The arm-end processor 2220 receives a variety of electrical signals from the bus connectors 719 including bus power signals, encoder signals, capture signals, and trigger signals. The bus connector further provides bus power to the arm-to-handle connector 832 if a power switch 2214 is activated by an LLP control signal from the arm-end processor 2220. The LLP control signal is a signal provided by an LLP or other accessory indicating that it is connected to the AACMM 10 and should receive electrical power from the bus. Besides sending bus power to the LLP or other accessory device, the arm-to-handle connector 832 also transfers high-speed data from accessories such as the LLP over the second bus 2184 (FIG. 4A, 4B) to the first base processor 2042. In an embodiment, actuator or button presses may result in signals being transmitted via the arm-to-handle connector 832 to the arm-end processor 2220 in response to pressing of a handle button. The capture signals are sent from the arm-end processor 2220 to the arm-to-handle connector 832 to synchronize measured values obtained from accessories such as the LLP with the angular readings obtained by the angular encoders in the arm-axis assemblies 100, 200, 300, 400, 500, 600, 700. In some cases an accessory may send a trigger signal to the arm-end processor 2220. An accessory device may also send a presence/ID signal indicating its presence and identity in the system.

FIG. 6 shows some elements of the lower arm. The mounting device 15 provides a way of a attaching the AACMM 10 to a mounting ring. The shock-absorber bumper 110 provides a way to cushion a potential drop of the AACMM 10 when affixing the arm to a mounting ring. The base 20 includes elements shown in FIG. 6 such as a base cover 22, a control panel 30, a battery access 40, and a port panel 50, as well as mechanical elements. The control panel 30 includes the on-off button 32, the Wi-Fi button 34, the Bluetooth™ button 36, the first-battery indicator light 38, and the second-battery indicator light 39. The battery access 40 includes the first battery door 42, the first battery-door latch 43, the first battery-door hinge 44, the second battery door 46, the second battery-door latch 47, and the second battery-door hinge 48. The port panel 50 includes an Ethernet jack 52, a USB data-transfer port 54, a USB charging port 55, an auxiliary port 56, and a power supply port 58.

The base 20 is further mounted with at least two image capture devices 25 for localizing the AACMM 10. FIG. 1A depicts image capture devices 25A and 25B positioned on either side of the base 20. The image capture devices 25A-B may be coupled to the base 20 at predetermined locations using respective mounts. The predetermined positions of the image capture devices 25A-B may be diametrically opposite with respect to the base 20, in one or more examples. Any other arrangement of the image capture devices 25 on the base 20 is possible. In an embodiment, the AACMM 10 may include more than two image capture devices 25, such as four image capture devices arranged on each side of the base 20 to acquire images in a 360 degree field of view about the base 20. The distance between the predetermined positions of the image capture devices 25A-B is known and predetermined. The image capture devices 25 can capture respective images of an object, such as a light emitting object, a light reflecting object, and the like. The respective images can be used for determining coordinates of the object, for example using triangulation based on stereoscopic vision. The determined coordinates of the object can be used for localizing a frame of reference for the AACMM 10, the frame of reference being used for measuring 3D coordinates by the AACMM 10.

Further, in one or more examples, for localizing the frame of reference of the AACMM 10, one or more positioning elements 26 are installed in a predetermined area 5 in which the AACMM 10 is being used. The positioning elements 26 can include light emitting devices like light emitting diodes (LEDs) that are arranged in a specific pattern. Alternatively, or in addition, the positioning elements 26 can include light reflective devices (e.g. retroreflector). In one or more examples, the light reflective devices reflect light within a specific wavelength range, such as infrared light, or a flash-light that may be emitted by the image capture devices 25A-B. As used herein, the term positioning elements 26 may be natural features of the object being measured or natural features within the environment. In an embodiment, the image capture device 25 is a single camera that is positioned in operation to acquire at least a predetermined number (e.g. 2, 3, 5, 9 etc.) of images of the positioning elements 26.

In another embodiment, each image capturing device 25 includes a pair of cameras separated by a baseline distance. In this embodiment, the image capturing device 25 is positioned in operation to acquire at least three positioning elements.

In one or more examples, the positioning elements 26 are arranged in a predetermined array that can be recognized in the images(s) captured by the image capture devices 25. For example, the positioning elements 26 is an array of LEDs or reflective elements. In one or more examples, the array can be an arrangement of the LEDs/reflective elements to form a geometric shape, such as a triangle, a cross, a square, a circle, an arrow, or any other shape. In one or more embodiments, the positioning elements 26 may be coded photogrammetry targets.

Accordingly, in an embodiment, a portable articulated arm coordinate measuring machine (AACMM) for measuring the coordinates of an object in space includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an electronic circuit that receives the position signal from the at least one position transducer and provides data corresponding to a position of the measurement device. The AACMM 10 further has a probe end disposed between the measurement device and the first end, the probe end having a first portion, a nut assembly, and a first connector, the first portion having a first threaded region, the nut assembly having a clutch nut, a nut cover, and an intermediate structure, the clutch nut having a clutch-nut threaded region disposed to engage the first threaded region, the clutch nut being moveable between a first position and a second position, the clutch nut disposed to engage with and rotate with the intermediate structure, the intermediate structure configured to engage with and rotate with the nut cover except when a torque applied by the nut cover to the intermediate structure in a first direction of rotation exceeds a torque threshold value; and an element disposed to couple to the probe end when the clutch nut is in the second position, the element having a second connector arranged to engage the first connector when the nut assembly couples the element to the probe end.

In an embodiment, the probe end of the AACMM is a seventh-axis assembly operable to rotate about a seventh axis of rotation of the AACMM and to determine an angle of rotation about the seventh axis of rotation. In an embodiment, the said element of the AACMM is selected from the group consisting of a removable cover, a handle, and a dimensional measurement accessory. In an embodiment, the said dimensional measurement accessory is a triangulation scanner. In an embodiment, the said element of the AACMM is rotationally coupled about an axis to the first end; and the element is disposed to rotate about the axis.

In an embodiment, the said first connector includes a first electrical connector portion; and the said second connector includes a second electrical connector portion. In an embodiment, the said intermediate structure comprises a clutch flexure. In an embodiment, the said clutch flexure further includes a cantilevered lip operable to set the torque threshold value.

In an embodiment, the said first portion is selected from the group consisting of a shaft of the probe end and a housing of the probe end, the shaft being operable to rotate within the housing. In an embodiment, the said measurement device comprises a tactile probe assembly. In an embodiment, the said element of the AACMM is also the measurement device.

In an embodiment, an AACMM 10 is a six-axis AACMM that includes a first-axis assembly 100, a second-axis assembly 200, a third-axis assembly 300, a fourth-axis assembly 400, a fifth-axis assembly 500, and a sixth-axis assembly 600, but not a seventh-axis assembly 700. A six-axis AACMM is advantageous whenever the main use of the AACMM is to measure with a tactile probe. Usually a seven-axis AACMM is selected when an LLP is used in addition to a tactile probe. For a six-axis AACMM, the seventh-axis assembly 700 is replaced with end-effector assembly. In one or more examples, exterior elements of the end-effector assembly include an end-effector yoke, a probe latch, upper end-effector buttons, lower end-effector buttons, an upper light diffuser, and a lower light diffuser. Elements of the end-effector assembly also found on the seventh-axis assembly 700 include the probe interface board, electrical contact pads, screws, adapter hole, guides, and kinematic balls.

In an embodiment, a portable articulated arm coordinate measuring machine (AACMM) includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an acceleration monitoring circuit coupled to the first end, the acceleration monitoring circuit included a first accelerometer; an electronic circuit that receives the position signal from the at least one position transducer and provides data corresponding to a position of the measurement device; a processor operable to determine three-dimensional (3D) coordinates of a point measured by the measurement device based at least in part on the provided data corresponding to the position of the measurement device, the processor further operable to determine a maximum level of acceleration of the first end.

In an embodiment, the acceleration monitoring circuit in the AACMM further includes a second accelerometer operable to respond to a different maximum acceleration than the first accelerometer.

In an embodiment, a portable articulated arm coordinate measuring machine (AACMM) includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; a parking clamp affixed to one of the plurality of connected arm segments, the parking clamp having a plurality of fingers disposed lock in place two of the plurality of the connected arm segments when the plurality of fingers are pressed into a parking clamp recess of the AACMM, the parking clamp further disposed to release the two of the plurality of the connected arm segments when the fingers of the parking clamp are pulled away from the parking clamp recess; an electronic circuit that receives the position signal from the at least one position transducer and provides data corresponding to a position of the measurement device; and a processor operable to determine three-dimensional (3D) coordinates of a point measured by the measurement device based at least in part on the provided data corresponding to the position of the measurement device.

Each of the axis assemblies 100, 200, 300, 400, 500, 600, and 700 typically contains an encoder system (e.g., an optical angular encoder system). The encoder system (i.e., transducer) provides an indication of the position of the respective arm segments and corresponding bearing cartridge groupings that all together provide an indication of the position of the probe 900 with respect to the base 20. Accordingly, the position of the object is measured by the AACMM 10 in a certain frame of reference—for example a local or global frame of reference.

The probe 900 is detachably mounted to the measurement probe housing 700, which is connected to bearing cartridge grouping 600. A handle accessory 1000 may be removable with respect to the measurement probe housing 700 by way of, for example, a quick-connect interface. In exemplary embodiments, the probe housing 700 houses a removable probe 900, which is a contacting measurement device and may have different tips 904 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 1000 is replaced with the LLP using the quick-connect interface. Other types of accessory devices may replace the removable handle 1000 to provide additional functionality. Examples of such accessory devices include, but are not limited to, one or more illumination lights, a temperature sensor, a thermal scanner, a bar code scanner, a projector, a paint sprayer, a camera, a video camera, an audio recording system or the like, for example.

In accordance with an embodiment, the base 20 of the portable AACMM 10 contains or houses an electronic data processing system that includes a base processing system 2000 (FIG. 2A) that processes the data from the various encoder systems within the AACMM 10 as well as data representing other arm parameters to support three-dimensional (3D) positional calculations, and resident application software that allows for relatively complete metrology functions to be implemented within the AACMM 10.

The base processing system 2000 may communicate with the encoder systems, sensors, and other peripheral hardware located away from the base 20 (e.g., a LLP that can be mounted to or within the removable handle 1000 on the AACMM 10). The electronics that support these peripheral hardware devices or features may be located in each of the bearing cartridge groupings in the axis assembly systems 100-600 located within the portable AACMM 10. As will be discussed in more detail herein, each of the angular encoders within the bearing cartridge groupings includes a definable identification number that allows the electronic data processing system to determine which angular encoder transmitted a positional signal and also compensate for known calibration errors in the particular encoder. The 3D positional calculations may be determined at least in part on positional signal that includes the angular encoder identification number.

The 3D coordinates of the point measured by the measurement device are based on a frame of reference in which the AACMM 10 operates within a predetermined area 5, such as a room, workshop, workbench, specific machine, or any other specific 3D volume/space. The AACMM 10 is used inside the predetermined area 5 to determine a 3D coordinate of one or more points within the predetermined area 5. The determined 3D coordinates may be further used for applications such as validating measurements/distances between the one or more points.

A technical challenge with the AACMM 10 is that when the AACMM 10 is entirely moved from a first position in the predetermined area 5 to a second position in the predetermined area 5, the AACMM 10 has to be recalibrated so that the 3D coordinates measured from the first position are substantially similar to those measured from the second position with reference to the frame of reference of the predetermined area 5. It should be noted that 'entirely moved' refers to the base 20 being moved from the first position to the second position, in one or more examples. Alternatively, or in addition, consider the case where the AACMM 10 is removed from the predetermined area 5 after measuring the 3D coordinates of one or more points at a first time point, and further, at a later second time point, the AACMM 10 is returned to the predetermined area 5 for measuring the same one or more points. If the frame of reference used during the second measurement is not substantially the same as the frame of reference used during the first measurement, the 3D coordinates measured for the one or more points can be different.

The technical solutions described herein address such technical challenges by automatically localizing the frame of reference used for measuring the 3D coordinates by the AACMM 10. In one or more examples, the localization is performed using at least one image capture devices. FIG. 1A depicts an embodiment having two image capture devices 25A and 25B positioned on either side of the base 20. The image capture devices 25A-B may be coupled to the base 20 at predetermined locations using respective mounts. The predetermined positions of the image capture devices 25A-B may be diametrically opposite with respect to the base 20, in one or more examples. The distance between the predetermined positions of the image capture devices 25A-B is known.

Further, in one or more examples, for localizing the frame of reference of the AACMM 10, one or more positioning elements 26 are installed in the predetermined area 5. The positioning elements 26 can include light emitting devices like light emitting diodes (LEDs) that are arranged in a specific pattern. Alternatively, or in addition, the positioning elements 26 can include light reflective devices (e.g. retroreflector). In one or more examples, the light reflective devices reflect light within a specific wavelength range, such as infrared light, or a flash-light that may be emitted by the image capture devices 25A-B.

The positioning elements 26 are placed at predetermined locations in the predetermined area 5. For example, if the predetermined area 5 is a room, the positioning element may be placed on a ceiling, a wall, a floor, or any other surface in the predetermined area 5. Alternatively, or in addition, the positioning elements 26 are fixed on an object that is being measured by the AACMM 10. For example, the positioning element 26 is positioned in a corner, at a top, or any other fixed location on a surface of the object being measured. It should be appreciated that natural features of the environment or the object being measured may also be used as positioning elements 26. The image capture devices 25 facilitate triangulating the position of the base 20 of the AACMM 10 in the predetermined area 5 using the positioning elements 26, which are at fixed predetermined locations in the predetermined area 5.

Figure 7:
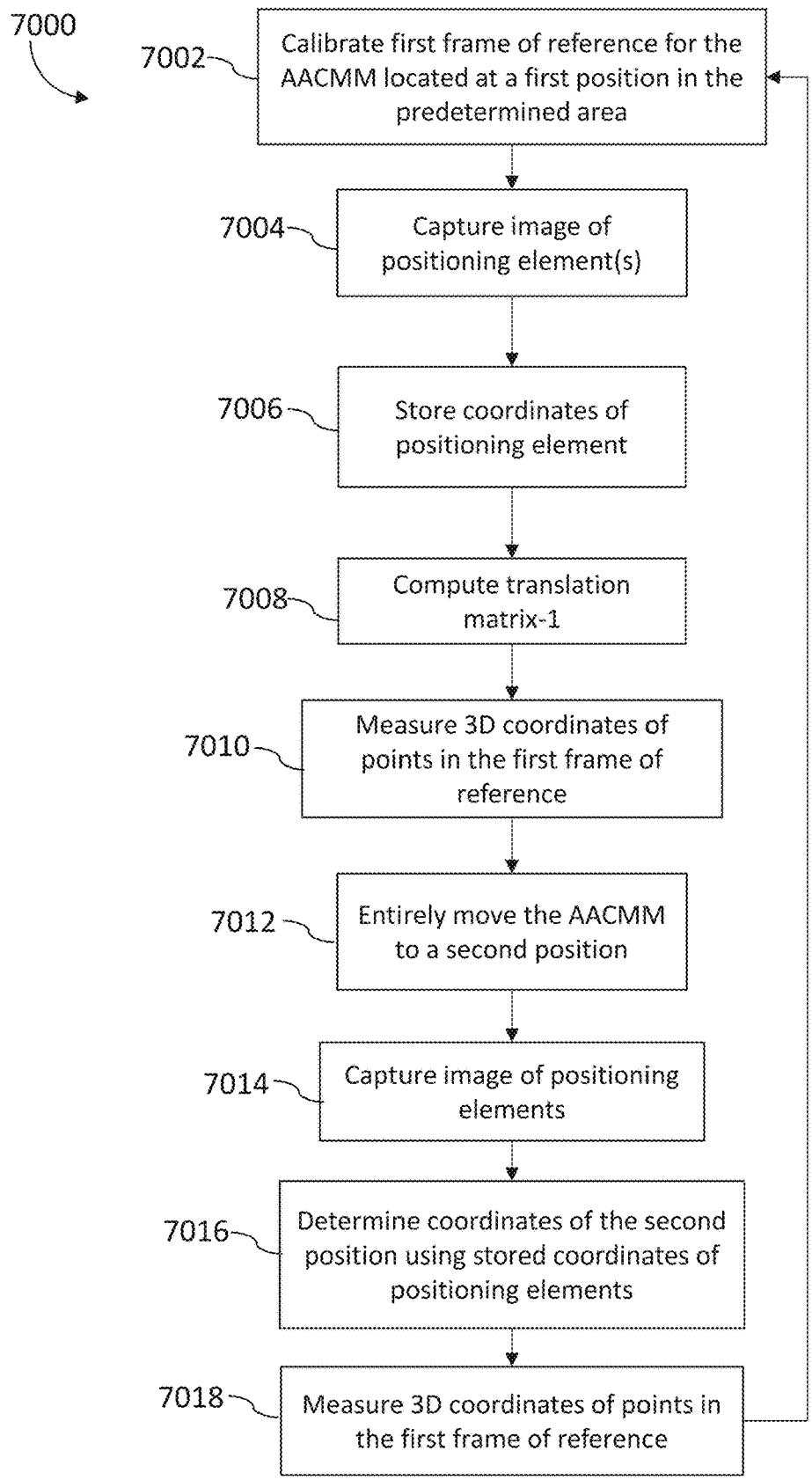
FIG. 7 depicts a flowchart of a method to localize an AACMM and measure 3D coordinates in a predetermined area according to one or more embodiments of the present invention.

FIG. 7 depicts a flowchart of a method 7000 for localizing a frame of reference of an AACMM and measuring 3D coordinates of a point using the localized AACMM according to one or more embodiments. The method 7000 includes calibrating the AACMM 10 in the predetermined area 5 for operating for the very first time, at 7002. The calibration is performed manually and a local frame of reference is setup for the AACMM 10. For example, the local frame of reference may setup the current position of the base 20 (e.g. the centroid of the base) as the origin of the predetermined area 5. Alternatively, or in addition, the local frame of reference sets up the current position of the base as any other point by providing a 3D coordinate for the current position. The local frame of reference may be setup in any other manner in other examples.

The method 7000 further includes capturing an image of the positioning element(s) 26 by the image capture devices 25, at 7004. Capturing the image may include switching/turning ON the positioning elements 26. In one or more examples, the processor 2072 controls the positioning elements 26 in a wireless manner, for example, via WiFi, BLE, or any other communication protocol. The positioning elements may be switched to generate a particular color in one or more examples. In one or more examples, the positioning elements 26 are switched on for a predetermined duration. Alternatively, or in addition, the positioning elements are switched OFF after image capturing is completed. In one or more examples, the positioning element(s) 26 may generate a structured pattern while the image(s) is being captured.

In general, there are two types of structured light patterns, a coded light pattern and an uncoded light pattern. As used herein the term coded light pattern refers to a pattern in which three dimensional coordinates of an illuminated surface of the object are based on single projected pattern and a single corresponding image. With a coded light pattern, there is a way of establishing a one-to-one correspondence between points on the projected pattern and points on the received image based on the pattern itself. Because of this property, it is possible to obtain and register point cloud data while the projecting device is moving relative to the object. One type of coded light pattern contains a set of elements (e.g. geometric shapes) arranged in lines where at least three of the elements are non-collinear. Such pattern elements are recognizable because of their arrangement. In contrast, as used herein, the term uncoded structured light pattern refers to a pattern that does not allow 3D coordinates to be determined based on a single pattern. A series of uncoded light patterns may be projected and imaged sequentially, with the relationship between the sequence of obtained images used to establish a one-to-one correspondence among projected and imaged points. As described herein, the image capture devices 25 are arranged in fixed position relative to the positioning elements 26 until the one-to-one correspondence has been established. Capturing the image includes capturing an image respectively by each of the image capture devices 25.

Alternatively, in case the positioning elements 26 are light reflective elements, capturing the image includes emitting light by the image capture devices 25 (or any other light emitting device controlled by the image capture devices 25) and capturing images of the reflective elements.

The image capture devices 25, by working in tandem, can determine a coordinate of the positioning element 26 with reference to the local frame of reference using triangulation. With at least two image capture devices 25, stereoscopic triangulation can be used to determine the coordinates of the positioning element 26. The processor 2072 stores computed distances and angles for determining the coordinates of the positioning elements 26 from the first position of the base 20, at 7006. In one or more examples, a second local frame of reference is determined with the positioning elements 26 being the origin. A first translation matrix is computed to translate the measured coordinates of the positioning elements 26 in the provided local frame of reference to the origin in the second local frame reference, at 7008. The translation matrix thus facilitates converting coordinates from the first (provided) frame of reference to the second (computed) frame of reference, and vice versa (using an inverse).

Further, the method 7000 includes measuring coordinates of the one or more points being scanned by the AACMM 10 using the first frame of reference, at 7010. Measuring the coordinates includes receiving the one or more measurements from the transducers in the assemblies 100-600 and computing the 3D coordinates based on the measurements in the first frame of reference.

The method 7000 further includes entirely moving the AACMM 10 from the first position to another, at 7012. The AACMM 10 may be moved to reach a point in the predetermined area 5 that was not accessible from the first position. Alternatively, or in addition, the AACMM 10 is moved and placed at the second position at a different time to measure the coordinates again. The AACMM 10 may not be placed at exactly the first position.

The method 7000 further includes capturing a second image of the positioning elements 26 using the image capture devices 25 from the second position, at 7014. The processor 2072 determines the coordinates of the second position at which the base 20 of the AACMM 10 is now located using the stored coordinates of the positioning elements 26, at 7016. Determining the coordinates of the second position includes reverse calculations of those performed when determining the stored coordinates of the positioning elements 26. For example, a second set of coordinates of the positioning elements 26 are determined using stereoscopic triangulation based on the second image from the second position. The processor further determines a second translation matrix to transform the second set of coordinates to the stored coordinates. The second translation matrix is stored.

The method 7000 further includes measuring 3D coordinates of one or more points using the AACMM 10 and translating the measured coordinates using the second translation matrix to output the coordinates in the first frame of reference (provided), at 7018. Alternatively, in one or more examples, the coordinates of the one or more points measured from the second position are first converted to the first frame of reference using the second translation matrix, and further converted to the second frame of reference (with position elements as origin) using the first translation matrix that was stored.

The AACMM 10 can be moved anywhere within the predetermined area 5 and measuring coordinates of one or more points in the predetermined area 5 using a consistent frame of reference. The method 7000 thus facilitates the AACMM 10 to provide consistent coordinates of the one or more points in the predetermined area 5 even if the AACMM 10 is entirely moved. The coordinates are consistent because of localizing the AACMM 10 using image capture devices 25 that are mounted at fixed position on the base 20 of the AACMM 10 and using triangulation to determine coordinates of the positioning elements 26, which are at known coordinates in the predetermined area 5.

In addition to the determination of the position and orientation of the AACMM 10, the image capture devices 25 may be used to determine if predetermined conditions are present during the operation of the AACMM 10. In an embodiment, the image capture devices 25 may acquire multiple images of the positioning elements 26 while the AACMM 10 is in a single location. It should be appreciated that when the AACMM 10 is positioned in a single location, the positioning elements 26 should not substantially move in the acquired images relative to the base 20. When one or more of the positioning elements moves between sequential images, this may indicate an undesired condition, such as vibration. It should be appreciated that vibration beyond a threshold is undesirable as it may result in erroneous measurements. In an embodiment, the images are acquired by the image capture devices 25 at a rate at least two times the frequency of the vibration being detected.

Figure 8:
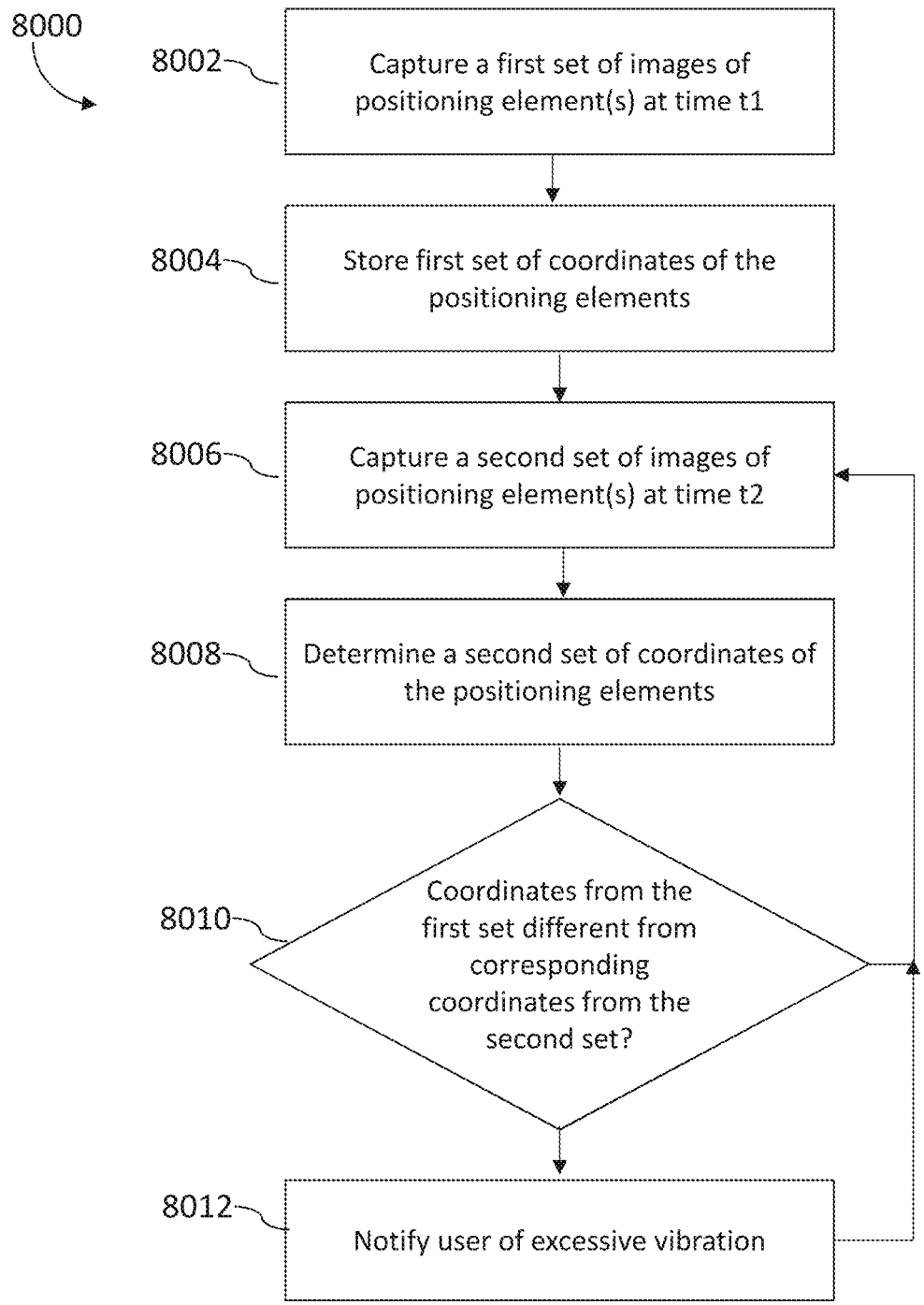
FIG. 8 depicts a flowchart of a method 8000 for monitoring vibrations of an operating AACMM according to one or more embodiments.

FIG. 8 depicts a flowchart of a method 8000 for monitoring vibrations of an operating AACMM according to one or more embodiments. The method 8000 includes capturing a first set of images of the positioning elements 26 by the one or more image capture devices 25, at 8002. In one or more examples, a single image that is captured includes more than one positioning elements 26. For example, the image may be an image of an entire wall, or an object surface, onto which two or more positioning elements 26 are installed. Accordingly, the image includes respective representations of the two or more positioning elements 26 that are installed.

The method 8000 further includes storing a first set of coordinates of the positioning elements 26, at 8004. The coordinates are determined based on the first set of images. The image capture devices 25, by working in tandem, can determine a coordinate of the positioning element 26 with reference to the local frame of reference using triangulation. With at least two image capture devices 25, stereoscopic triangulation can be used to determine the coordinates of the positioning element 26. The processor 2072 stores computed distances and angles for determining the coordinates of the positioning elements 26 when the AACMM 10 is in a first pose.

Further, the method includes repeating the steps periodically, to capture a second set of images and determining a second set of coordinates of the positioning elements 26 based on the second set of images, at 8006 and 8008. The second set of coordinates is determined at a time t2 different than the time t1 at which the first set of coordinates is determined. In one or more examples, the AACMM 10 changes pose, or is transitioning between a first pose and a second pose at time t2, the AACMM 10 being in the first pose at the time t1.

The processor 2072 compares the coordinates of the positioning elements 26 from the first set of coordinates with corresponding coordinates from the second set of coordinates, at 8010. If the difference in the corresponding measured coordinates of a positioning element 26 exceeds a predetermined threshold, the processor 2072 determines that the AACMM 10 has experienced an excessive vibration and generates a notification for a user, at 8012. For example, the predetermined threshold can be a displacement of 0.1, 0.01, 0.5, or any other such displacement between first measured coordinates and second measured coordinates of a positioning element 26. In one or more examples, the comparison may include determining an average (mean) displacement for all of the positioning elements 26 and comparing the average with the predetermined threshold. Other techniques may be used in other examples to determine if the AACMM 10 experiences a vibration from one pose to another based on the measured coordinates. The notification may be an audible notification, a visual notification, a haptic notification, and the like or a combination thereof.

In one or more examples, the processor 2072 continuously and periodically monitors if the AACMM 10 is experiencing any vibration by repeating the steps of capturing the second set of images and comparing the determined coordinates based on the second set of images.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A portable articulated arm coordinate measuring machine (AACMM) for measuring the coordinates of an object in space, comprising:
   a base;
   a manually positionable arm portion having an opposed first end and second end, the arm portion being rotationally coupled to the base, the arm portion including a plurality of connected arm segments, each arm segment including at least one position transducer for producing a position signal;
   an electronic circuit configured to localize the AACMM, the localization comprising:
     in response to the base being placed at a first position:

receiving a first frame of reference associated with a predetermined area;

capturing a first set of images of a positioning element in the predetermined area using at least two image capture devices;

determining first 3D coordinates of the positioning element in the first frame of reference from the first position using the first set of images; and receiving the position signal from the at least one position transducer and computing 3D coordinates corresponding to a position of a first measurement probe in the predetermined area, the 3D coordinates based on the first frame of reference; and in response to the base being moved to a second position:

capturing a second set of images of the positioning element in the predetermined area using the at least two image capture devices;

determining second 3D coordinates of the positioning element from the second position using the second set of images;

determining a translation matrix to convert the second 3D coordinates to the first 3D coordinates; and receiving the position signal from the at least one position transducer and computing the 3D coordinates corresponding to the position of the first measurement probe in the predetermined area, the 3D coordinates converted to the first frame of reference by using the translation matrix.

2. The AACMM of claim 1, wherein positioning element comprises a light emitting device.

3. The AACMM of claim 1, wherein the positioning element comprises a light reflective element.

4. The AACMM of claim 1, wherein the positioning element is placed at a predetermined fixed position in the predetermined area.

5. The AACMM of claim 1, wherein the image capture devices are mounted on the base with a predetermined distance between the image capture devices.

6. The AACMM of claim 5, wherein the 3D coordinates of the positioning element are determined using triangulation.

7. The AACMM of claim 1, wherein the translation matrix is a first translation matrix, and the electronic circuit is further configured to:

compute a second translation matrix to convert the first 3D coordinates of the positioning element to an origin.

8. The AACMM of claim 1, wherein the first measurement probe is a tactile measurement probe operable to measure three-dimensional (3D) coordinates in response to contacting a probe tip of the tactile measurement probe with points on an object in the predetermined area.

9. A method for localizing a portable articulated arm coordinate measuring machine (AACMM), the method comprising:

in response to a base of the AACMM being placed at a first position:

receiving a first frame of reference associated with a predetermined area;

capturing a first set of images of a positioning element in the predetermined area using at least two image capture devices;

determining first 3D coordinates of the positioning element in the first frame of reference from the first position using the first set of images; and receiving a position signal from at least one position transducer of the AACMM and compute 3D coordinates corresponding to a position of a first measurement probe in the predetermined area, the 3D coordinates based on the first frame of reference; and in response to the base being moved to a second position:

capturing a second set of images of the positioning element in the predetermined area using the at least two image capture devices;

determining second 3D coordinates of the positioning element from the second position using the second set of images;

determining a translation matrix to convert the second 3D coordinates to the first 3D coordinates; and receiving the position signal from the at least one position transducer and compute the 3D coordinates corresponding to the position of the first measurement probe in the predetermined area, the 3D coordinates converted to the first frame of reference by using the translation matrix.

10. The method of claim 9, wherein positioning element comprises a light emitting device.

11. The method of claim 9, wherein the positioning element comprises a light reflective element.

12. The method of claim 9, wherein the positioning element is placed at a predetermined fixed position in the predetermined area.

13. The method of claim 9, wherein the image capture devices are mounted on the base with a predetermined distance between the image capture devices.

14. The method of claim 13, wherein the 3D coordinates of the positioning element are determined using triangulation.

15. The method of claim 9, wherein the translation matrix is a first translation matrix, and the method further comprises:

computing a second translation matrix to convert the first 3D coordinates of the positioning element to an origin.

16. The method of claim 9, wherein the first measurement probe is a tactile measurement probe operable to measure three-dimensional (3D) coordinates in response to contacting a probe tip of the tactile measurement probe with points on an object in the predetermined area.

17. A computer program product comprising a memory storage device having computer executable instructions stored therein, the computer executable instructions when executed by a processor cause the processor to localize a portable articulated arm coordinate measuring machine (AACMM), the localizing comprising:

in response to a base of the AACMM being placed at a first position:

receiving a first frame of reference associated with a predetermined area;

capturing a first set of images of a positioning element in the predetermined area using at least two image capture devices;

determining first 3D coordinates of the positioning element in the first frame of reference from the first position using the first set of images; and receiving a position signal from at least one position transducer of the AACMM and compute 3D coordinates corresponding to a position of a first measurement probe in the predetermined area, the 3D coordinates based on the first frame of reference; and in response to the base being moved to a second position:

capturing a second set of images of the positioning element in the predetermined area using the at least two image capture devices;

determining second 3D coordinates of the positioning element from the second position using the second set of images;

determining a translation matrix to convert the second 3D coordinates to the first 3D coordinates; and receiving the position signal from the at least one position transducer and compute the 3D coordinates corresponding to the position of the first measurement probe in the predetermined area, the 3D coordinates converted to the first frame of reference by using the translation matrix.

18. The computer program product of claim 17, wherein positioning element comprises a light emitting device.

19. The computer program product of claim 17, wherein the positioning element comprises a light reflective element.

20. The computer program product of claim 17, wherein the positioning element is placed at a predetermined fixed position in the predetermined area.

\* \* \* \* \*